Patented Aug. 3, 1954

2,685,589

UNITED STATES PATENT OFFICE 2,685,589

THERAPEUTIC COMPOSITION

Charles Harmon Tilford, Cincinnati, and Marcus George Van Campen, Jr., Wyoming, Ohio, assignors to The Wm. S. Merrell Company, Cincinnati, Ohio, a corporation of Delaware No Drawing. Application February 19, 1952,
Serial No. 272,524

5 Claims. (Cl. 260—332.2)

This invention relates to new compounds which are useful as antispasmodics, having antispasmodic action on normal smooth muscle as well as against neurotropic and musculotropic spasms of smooth muscle, and which, despite their high activity, are relatively free from undesirable side reactions and have a suitable low toxicity. They are also useful as antifungal agents.

The new compounds of the invention are 1-thienyl-cycloaalkanecarboxylic acid esters of tertiary amino alcohols. They may be represented by the formula

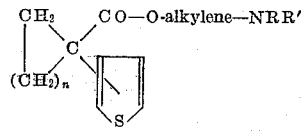

in which $n$ is a number from 1 to 4, R and R′ are alkyl groups of 1 to 3 carbon atoms (which may be alike or different) or together form an alkylene radical which with the nitrogen forms a cyclic radical as in the piperidino compounds, such radical having not more than 6 carbon atoms; and in which the radical designated by "alkylene" is a lower alkylene radical such as methyl, ethyl, n-propyl, isopropyl or the like. These compounds are basic in nature, and although they may be produced in the form of the free base, will ordinarily be used in the form of a salt, such as the phosphate, sulfate, tartrate, glycolate, levulinate or the like, but usually as the hydrochloride.

These new compounds are conveniently prepared by re-esterification of the corresponding alkyl esters, for example, the ethyl ester, with the selected tertiary amino alcohol, with separation of liberated alcohol by distillation, using an inert solvent such as xylene and a catalyst, such as sodium, the alkyl ester in turn being produced by the acid alcoholysis of the corresponding nitrile. This method of preparation is illustrated by the following type equation:

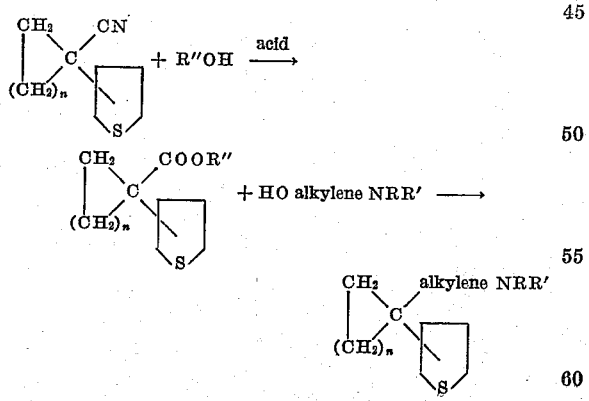

The invention will be further illustrated by the following specific examples, but it is not limited thereto.

EXAMPLE I

*Beta-diethylaminoethyl 1-(2-thienyl)-cyclohexanecarboxylate*

To 600 ml. of liquid ammonia containing 0.8 gram of ferric nitrate were added 29.9 grams of freshly cut sodium over a period of 30 to 40 minutes. 75 grams of 2-thienylacetonitrile were then added with stirring. The mixture was cooled to −50° C. and 138 grams of pentamethylene bromide and 500 ml. of dry ether were added over a period of one hour. The reaction mixture was slowly heated and finally refluxed for 4 hours. About 500 ml. of water were then cautiously added. The ether layer which formed was separated, dried over sodium sulfate and fractionally distilled. 1-(2-thienyl)-cyclohexyl cyanide was collected at 102 to 104° C./0.28 mm. 17 grams of this cyanide, 125 ml. of ethyl alcohol and 25 ml. of concentrated sulfuric acid were refluxed for 72 to 96 hours. The reaction product was then poured into a vessel containing 300 grams of ice and the oil that separated was extracted with toluene and fractionally distilled. Ethyl 1-(2-thienyl)-cyclohexanecarboxylate was collected at 119 to 124° C./0.26 mm. 9 grams of this ester, 9 grams of beta-diethylaminoethanol and 30 ml. of xylene were then introduced into a flask and about 5 ml. of distillate taken off to remove any water. 0.5 gram of sodium was added. The toluene-ethanol binary mixture was slowly distilled off at 68° C. After an hour, no more distillate came over at this temperature so the reaction mixture was distilled up to a temperature of 80° C. at a pressure of 20 mm. to remove any volatile materials. The residue was taken up in 100 ml. of petroleum ether, and washed with water. Alcoholic HCl was then added until the mixture was acid to Congo red. The crude, solid beta-diethylaminoethyl 1-(2-thienyl) - cyclohexanecarboxylate hydrochloride was collected on a filter. On recrystallization from butanone it gave a product melting at 139 to 140° C. (uncorrected).

EXAMPLE II

Following the procedure of Example I, but using beta-dimethylaminoethanol (in equivalent molar proportions) instead of the beta-diethylaminoethanol gave beta-dimethyl-aminoethyl 1-(2-thienyl)-cyclohexanecarboxylate hydrochloride, melting at 135 to 137° C. (uncorrected).

EXAMPLE III

Following the procedure of Example I but using 129.6 grams of tetramethylene bromide instead of the pentamethylene bromide gave an intermediate 1-(2-thienyl)-cyclopentyl cyanide distilling at 95 to 98° C./0.3 mm., an intermediate ethyl 1-(2-thienyl)-cyclopentanecarboxylate distilling at 145 to 150° C./16 mm., and a final beta-diethylaminoethyl 1-(2-thienyl)-cyclopentanecarboxylate hydrochloride melting at 118 to 121° C. (uncorrected).

Other 1-thienyl-cycloalkanecarboxylate tertiary amino alcohol esters included in the invention are:

Dimethylaminomethyl 1-(2-thienyl)-cyclobutylcarboxylate.
Dimethylaminopropyl 1-(3-thienyl)-cyclohexylcarboxylate.
Methylethylaminoethyl 1-(3-thienyl)-cyclopentyl-carboxylate.
Piperidinomethyl 1-(2-thienyl)-cyclopropylcarboxylate.
Dipropylaminoethyl 1-(2-thienyl)-cyclohexylcarboxylate.
Diethylaminoisopropyl 1-(2-thienyl)-cyclohexylcarboxylate.

The antifungal activity of the compounds was demonstrated by a comparison of the antifungal activity of diphenylpyraline (1-methyl-4-benzhydryloxy-piperidine of the formula

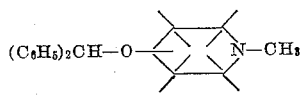

as a standard of comparison) against

Beta-diethylaminoethyl 1-(2-thienyl)-cyclohexane-carboxylate.HCl,
Beta-diethylamino-ethyl 1-(2-thienyl)-cyclopentane-carboxylate.HCl, and
Beta-dimethylaminoethyl 1-(2-thienyl) cyclohexane-carboxylate.HCl using the following test fungae:

1. Candida albicans
2. Cryptococcus neoformans
3. Nocardia asteriodes
4. Micosporum audouini
5. Trycophyton rubrum
6. Trycophyton mentagrophytes
7. Histoplasma capsulatum
8. Blastomyces dermatiditis The diphenylpyraline showed substantially less activity than each of the other three compounds.

We claim:
1. Compounds of the formula

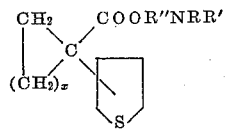

in which $x$ is a number from 1 to 4, the radical NRR' is selected from the group consisting of dialkylamino radicals in which the alkyl groups have not more than 3 carbon atoms and cyclic radicals in which RR' represents an alkylene chain having not more than 6 carbon atoms and R'' is a divalent group of the formula $(C_nH_{2n})$ in which $n$ is an integer not greater than 4.

2. Compounds of the formula

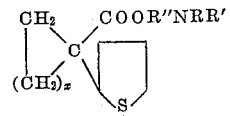

in which $x$ is a number from 1 to 4, the radical NRR' is selected from the group consisting of dialkylamino radicals in which the alkyl groups have not more than 3 carbon atoms and cyclic radicals in which RR' represents an alkylene chain having not more than 6 carbon atoms and R'' is a divalent group of the formula $C_nH_{2n}$) in which $n$ is an integer not greater than 4.

3. Beta-diethylaminoethyl 1-(2-thienyl)-cyclohexanecarboxylate.
4. Beta-dimethylaminoethyl 1-(2-thienyl)-cyclohexanecarboxylate.
5. Beta-diethylaminoethyl 1-(2-thienyl)-cyclopentanecarboxylate.

References Cited in the file of this patent

UNITED STATES PATENTS

| Number | Name | Date |
|---|---|---|
| 2,541,024 | Blicke | Feb. 13, 1951 |
| 2,541,634 | Blicke | Feb. 13, 1951 |
| 2,561,385 | Leonard | July 24, 1951 |

OTHER REFERENCES

Huttrer, Enzymologia, 12, 308-9 (1948).
Powers, Advancing Fronts in Chem., 1946, p. 33.
Whitmore, Org. Chem., pp. 884, 893, Van Nostrand, N. Y., 1937.
Richter, Organic Chem., pp. 649-50, Wiley, N. Y., 1938.
Williams, Detoxication Mechanisms, p. 194, Wiley, N. Y., 1947.
Lands, Proc. Soc. Exp. Bio. Med. 57, 55-6 (1944).
Alles, J. Pharm. Exp. Ther. 72, 265 (1941).
Caesar and Sachanen, Ind. Eng. Chem. 40, 922 (1948).
Steinkopf, The Chemie des Thiophens, p. 21, Edwards Lithoprint of 1941 publication.
Viaud, Products Pharm. 2, 58, Feb. 1947.
Le Suer, 3-Substituted Thiophenes, Doctorate Thesis, p. 2, Dept. of Chem., Indiana Univ., Call No. QD 1000 L 644.
Karrer, "Organic Chemistry," Elsevier Pub. Co., 1946, 2nd Eng. Ed., pp. 180-190.